United States Patent [19]
Ferguson

[11] Patent Number: 5,844,594
[45] Date of Patent: Dec. 1, 1998

[54] METHOD AND APPARATUS FOR MPEG ENCODING

[75] Inventor: Robert Ferguson, Seattle, Wash.

[73] Assignee: Microsoft Corporation, Redmond, Wash.

[21] Appl. No.: 539,417

[22] Filed: Oct. 5, 1995

[51] Int. Cl.$^6$ .................................................. H04N 7/173
[52] U.S. Cl. ............................ 348/10; 348/12; 348/384; 455/5.1; 455/6.2
[58] Field of Search .................................. 348/10, 12, 13, 348/6, 7, 390, 385, 384, 388, 400, 401, 402, 409, 415, 416; 455/4.2, 5.1, 6.1, 6.2, 6.3; H04N 7/16, 7/173

[56] References Cited

U.S. PATENT DOCUMENTS

| | | | |
|---|---|---|---|
| 5,546,336 | 8/1996 | Pechaneck et al. | 364/725 |
| 5,721,878 | 2/1998 | Ottesen et al. | 348/7 |

FOREIGN PATENT DOCUMENTS

| | | | |
|---|---|---|---|
| 7-222163 | 8/1995 | Japan | H04N 7/32 |
| WO94/01964 | 1/1994 | WIPO . | |

OTHER PUBLICATIONS

White, "Covert Distributed Processing with Computer Viruses," *Advances in Cryptology,* Crypto 89, Springer LNCS, v. 435, pp. 616–619.

Plotkin, "The Digital Compression Facility–A Solution to Today's Compression Needs, " 1994 IEEE, pp. 445–449.

Bevinakoppa et al., "Digital Image Compression on a Network of Transputers," Proc. of 5th Australian Transputer and OCCAM User Group Conference (Transputers and Parallel Applications TAPA 92), IOS Press, Amsterdam, pp. 25–32).

Shen et al., "A Parallel Implementation of an MPEG1 Encoder: Faster Than Real–Time!", Proc. of SPIE Conf. on Digital Video Compression, San Jose, CA, Feb. 1995

"Issues and Challenges in ATM Networks", Ronald J. Vetter, H.C. Du, Communications of the ACM, Feb. 1995; vol. 38, No. 2, p. 29.

"ATM Concepts, Architectures, and Protocols", Ronald J. Vetter, Communications of the ACM, Feb. 1995; vol. 38, No. 2, p. 31–38, 109.

"ATM Network: Goals and Challenges", B.G. Kim and P. Wang, Communications of the ACM, Feg. 1995, vol. 38, No. 2, pp. 40–44, 109.

"LAN and I/O Convergence: A Survey of the Issues "Martin W. Sachs, Avraham Leff, & Denise Sevigny, COMPUTER, Dec. 1994, pp. 24–32.

"Advances in Interactive Digital Multimedia Systems", Edward A. Fox, COMPUTER, Oct. 1991, pp. 9–21.

"JPEG–Like Image Compression, Part 1", Craig A. Lindley, Dr. Dobb's Journal, Jul. 1995, pp. 50–58, 101–102.

"JPEG–Like Image Compression, Part 2", Craig A. Lindley, Dr. Dobb's Journal, August 1995, pp. 62–66, 102–105.

"Why MPEG is Hot", Jan Ozer, PC Magazine, Apr. 11, 1995, pp. 130–131.

"Shot by Shot", Jan Ozer, PC Magazine, Apr. 11, 1995, pp. 104–107, 110.

"MPEG–2 encoders make show of force at NAB", Junko Yoshida, Electronic Engineering Times, Apr. 10, 1995.

(List continued on next page.)

*Primary Examiner*—Chris Grant
*Attorney, Agent, or Firm*—Klarquist Sparkman Campbell Leigh & Whinston, LLP

[57] ABSTRACT

MPEG compression for video/audio data is completed in real- or better than real-time by using computer processors in thousands of television receiver set-top boxes interconnected to a cable television network. The set-top boxes form a massively parallel, distributed computer network. MPEG compression for video/audio services is completed by partitioning the processing of video/audio frames into subtasks, and distributing these subtasks to set-top boxes which are not being used for subscriber services. After compression, the compressed video/audio frames are collected from the set-top boxes and are reconstructed into a compressed video/audio stream in the proper temporal order.

43 Claims, 3 Drawing Sheets

OTHER PUBLICATIONS

"Multimedia Storage Servers: A Tutorial", D. James Gemmell, Harrick M. Vin, Dilip D. Kandlur, P. venkat Rangan, Lawrence A. Rowe, COMPUTER, May 1995, pp. 40–49.

"Survey of software and hardware VLC architectures", Chad Fogg, SPIE, vol. 2186, Image and Video Compression (1994), pp. 29–37.

"Design considerations for JPEG Video and Synchronized Audio in a Unix Workstation Environment", Bernard I. Szabo, Gregory K. Wallace, USENIX–Summer '91, pp. 353–368.

"Hardware–software combo could simplify MPEG real–time video compression", Richard Nass, Electronic Design, May 3, 1993, pp. 36.

"New offerings buoy MPEG as video standard", Erica Schroeder, Desktop Computing, PC Week, May 8, 1995, pp. 1 & 29.

"Software Implementation of MPEG–II Video Encoding Using Socket Programming in LAN ". Yanbin Yu & Dimitris Anastassiou, SPIE vol. 2187, pp. 229–240.

METHOD AND APPARATUS FOR MPEG ENCODING

RELATED APPLICATION DATA

This application is related to application 08/539,399, also filed on Oct. 5, 1995.

FIELD OF THE INVENTION

The present invention relates to compression of video or audio data, and more particularly relates to a method and apparatus for performing distributed MPEG compression.

BACKGROUND AND SUMMARY OF THE INVENTION

The information superhighway holds great promise for the distribution of entertainment programming, as well as information. A problem, however, is the massive data size of entertainment programming, such as broadcast-quality video/audio. A single second of video programming includes about 54 megabytes of data (1.8 MB frame, 30 frames per second). A two hour movie thus represents about 389 gigabytes of data. The technical and logistical challenges associated with storing and transmitting this volume of data are enormous.

To address this problem, various video/audio compression techniques are known. One of these, MPEG II (Motion Pictures Expert Group), is described by ISO/IEC Standard 13818 and promises to provide a several hundred-fold reduction in data size while maintaining broadcast quality. Compression by a factor of 200 reduces the storage requirements for a two hour movie to less than two gigabytes, and reduces the requisite transmission speed down to 270 kilobytes per second. When this data is received at a subscriber's premises, it can be expanded back to substantially its original form by an MPEG decompressor, e.g. built into a set-top cable box.

The only difficulty that remains is to compress all of the entertainment programming ever produced so that it can be stored and distributed in compressed form. This is not a small undertaking.

MPEG compression is a computationally intensive process. It is so computationally intensive that even expensive parallel processors optimized for this task (e.g. the IBM PVS system) requires dozens of hours to compress a two hour movie (i.e. many times slower than real time). Less expensive devices, often in the form of arrays of customized integrated circuits, are available to perform real time compression for low performance applications, such as video conferencing, but are not suitable for use with broadcast quality material.

While specialized hardware processors offer advantages in speed, they suffer in terms of flexibility. For example, different video passages have different characteristics making them susceptible to different optimizations during the compression process. Dedicated hardware approaches are ill-suited to effect such optimizations.

In terms of flexibility, software-based MPEG compression is preferred, since the processing techniques and parameters can more easily be adapted to the particular characteristics of the video clip being compressed. But software-based techniques are generally an order of magnitude slower than comparable hardwarebased approaches.

As a hybrid, some researchers have attempted MPEG processing on a network of computers, as illustrated by Bevinakoppa et al, "Digital Image Compression on a Network of Transputers," Transputers and Parallel Applications, TAPA-92, pp. 25–32, 1993, and Yu et al, "Software Implementation of MPEG-II Video Encoding Using Socket Programming in LAN," Proc. of the SPIE, Vol. 2187, pp. 229–40, 1994. But such approaches have a variety of drawbacks, including poor use of network bandwidth, the high cost of the individual processing nodes, the unavailability of the nodes for other tasks during MPEG processing, and the delay of the MPEG processing if one of these nodes is preempted for another use.

In accordance with a preferred embodiment of the present invention, the foregoing and other drawbacks of the prior art are overcome. By forming a massively parallel, distributed system using processors in interconnected and otherwise-idle cable television set-top boxes, MPEG compression tasks are partitioned and performed economically in real- or better than real-time. Processing interruptions due to subscriber uses of their cable set-top boxes are detected and handled without unduly slowing the compression process.

The foregoing and other features and advantages of the preferred embodiment of the present invention will be more readily apparent from the following detailed description, which proceeds with reference to the accompanying drawings.

DETAILED DESCRIPTION OF A PREFERRED EMBODIMENT

Figure 1:
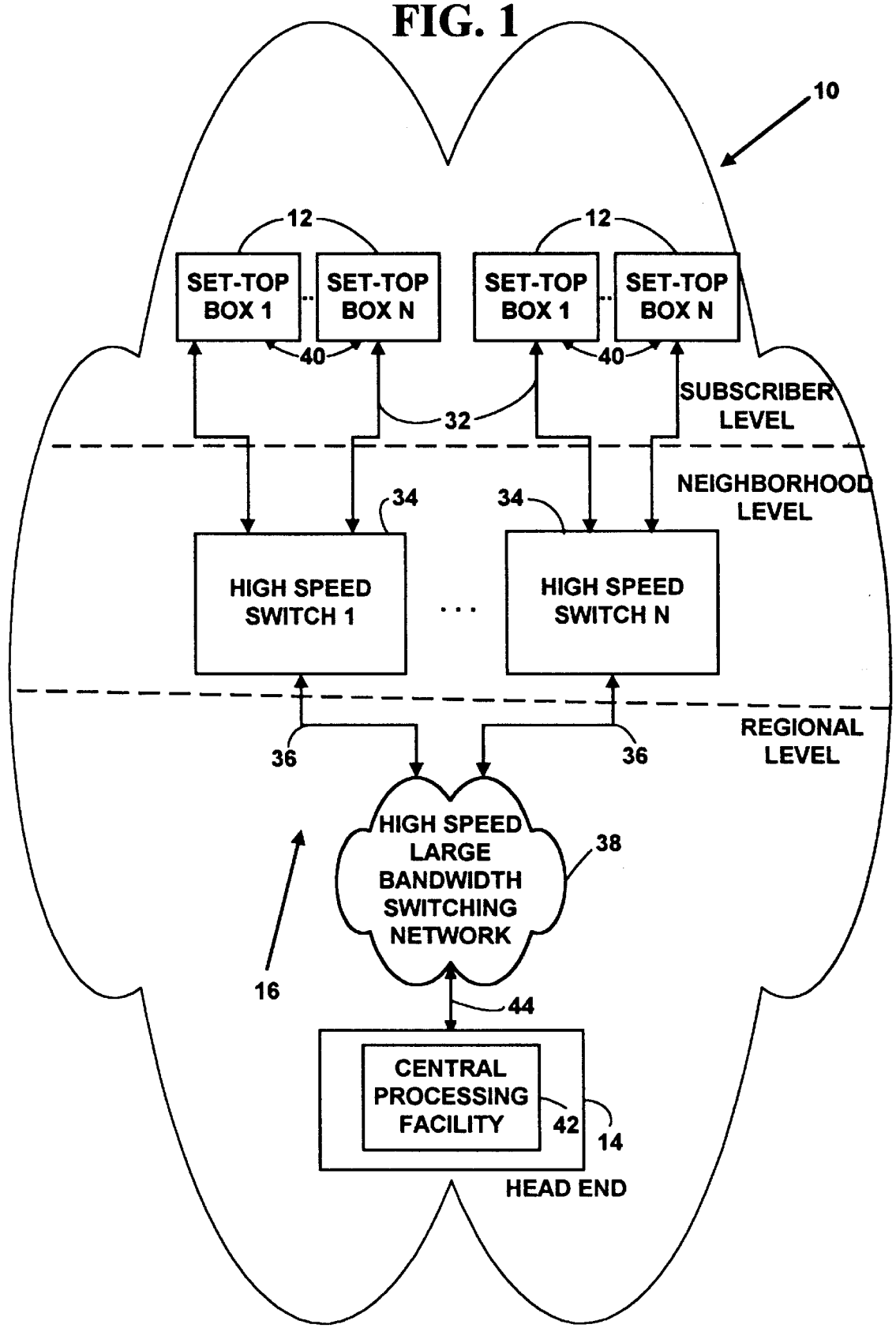
FIG. 1 is a block diagram of a massively parallel distributed computing system according to one embodiment of the invention.

Referring to FIG. 1, a massively parallel distributed computing system 10 includes hundreds, thousands, or potentially millions of set-top boxes 12 which are coupled to a cable system head end 14 through a network 16.

Figure 2:
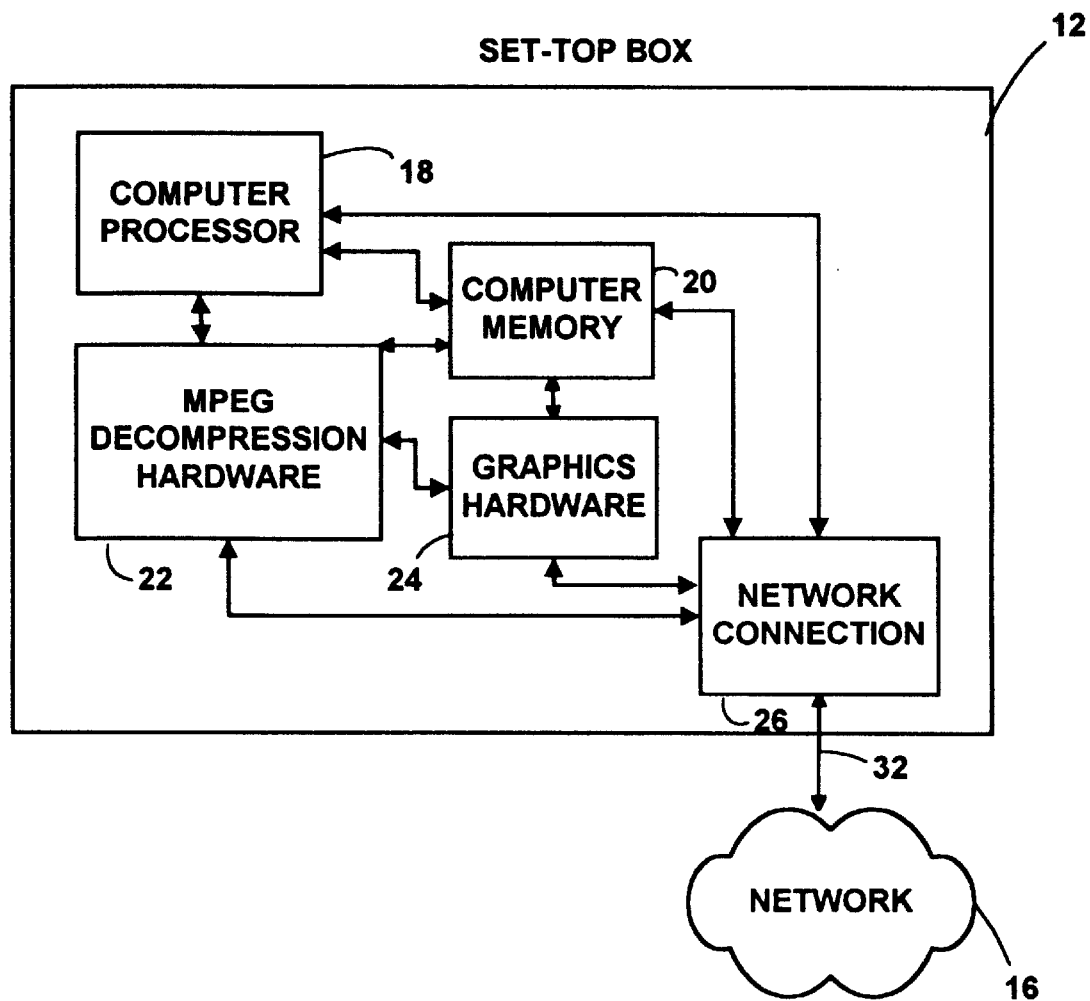
FIG. 2 is a block diagram of a set-top box used in the computing system of FIG. 1.

As shown in FIG. 2, each set-top box 12 consists of a computer processor 18, computer memory 20, MPEG decompression hardware 22, graphics hardware 24, and a network connection 26. The illustrated set-top box does not contain any local secondary storage such as a hard disk, but local secondary storage can be added. The computer processor 18 can be any general purpose CPU, such as an Intel X86, Motorola 68000-series, or PowerPC chip, or can be a chip developed especially for the set-top environment. Two more processors working in parallel can also be used.

The illustrated computer memory 20 is high speed random access memory (RAM). However, the computer memory is not limited to high speed RAM, but can be any other high speed computer memory, optical memory, protein memory or other local secondary storage. Experience has shown that a memory size of at least 8 MB gives good performance results. However a larger or smaller memory size can be used.

The MPEG decompression hardware 22 a self-contained chip for MPEG decompression (decoding) based on the ISO standard, and is used to decompress entertainment programming transmitted to the set-top box 12 for viewing. This decompression hardware is not utilized in the preferred embodiment of the present invention.

The graphics hardware 24 is an EGA, VGA, SVGA graphics board, but can be any circuitry adapted to display high quality video.

The network connection 26 serves to interface the set-top box to the cable system.

The architecture of advanced set-top boxes is well known to artisans in this field, and so is not belabored here. See, e.g., Furht et al, "Design Issues for Interactive Television Systems," IEEE Computer Magazine, May, 1995, pp. 25–39, and the references cited therein.

Figure 3:
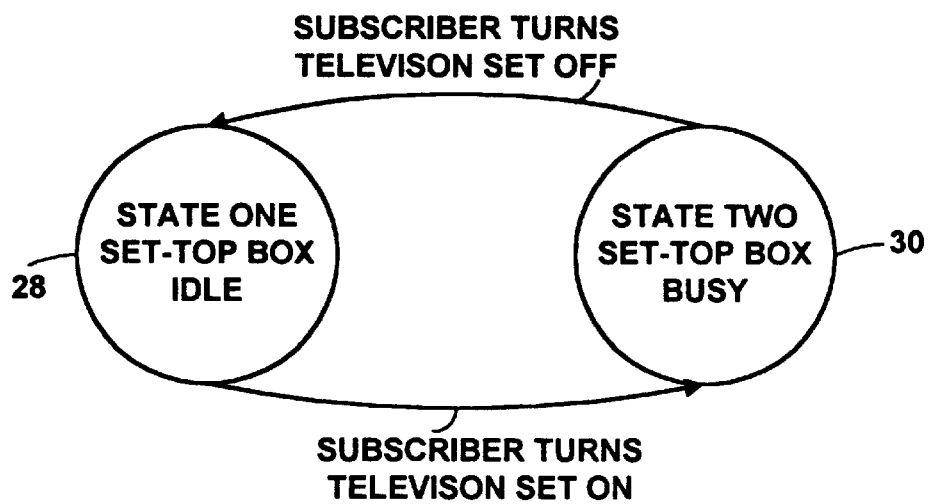
FIG. 3 is a block diagram of the central processing facility used in the computing system of FIG. 1.

As shown in FIG. 3, each set-top box 12 operates in one of two distinct states. In a first state 28, the set-top box is used by the massively parallel computing system 10 as a processing unit to complete MPEG compression subtasks. In a second state 30, the set-top box is used to perform a subscriber function, such as viewing video programming, videotext, electronic programming guides, etc. The set-top box 12 typically operates in the first state (28), and is switched to the second state (30) when a user turns on the associated television set to view subscriber information.

Returning to FIG. 1, the network 16 includes coaxial cables 32, high speed switches 34, fiber optic cables 36, and a high speed, large bandwidth switching network 38.

Within a small geographical area, such as a neighborhood or apartment building, a group 40 of set-top boxes 12 are coupled together by coaxial cable 32. This same cable couples the grouping of boxes to a local high speed switch 34.

In the preferred embodiment, the local high speed switch 34 is an Asynchronous Transfer Mode (ATM) Switch that uses an ATM protocol. An ATM switch 34 uses packet switching technology, and is capable of transporting broadband data (such as video/audio) at rates greater than 100 MB per second. However, any other high speed, large bandwidth switches can be used in place of the ATM switch 34.

In more detail, the local high speed switches 34 transport video frames via ATM packets and route the data packets using the Internet Protocol (IP). IP is the network layer of the Internet communications protocol which provides a connectionless delivery service and also provides routing of data packets to the set-top boxes. The IP network layer, over the ATM data link/physical layers, provides an appropriate high speed large bandwidth data transport service. Other routing, communications protocols, including connection or connectionless services can be used in place of the IP-over-ATM combination.

The ATM protocol is divided into three layers: the physical layer, the ATM layer, and the ATM adaptation layer. The combination of the ATM layer and the ATM adaptation layer represent the data link layer of the OSI network model (The OSI model contains the physical, data link, network, transport, session, presentation, and application layers). The physical layer encodes and decodes the data into suitable electrical/optical waveforms for transmission and reception on the communication medium used. The ATM layer performs switching and multiplexing functions. The ATM adaptation layer defines a set of service classes to fit the needs of different users requests and converts incoming user requests into ATM cells for transport.

The local high speed large bandwidth switches 34 are interconnected with other local high speed large bandwidth switches by fiber optic cable 36 to form a high speed, large bandwidth switching network 38. Other high speed large bandwidth interconnections such as wireless connections, etc. can be used in place of the fiber optic cable.

The foregoing network infrastructure is illustrative only and many variants thereon, including wireless interconnections, satellite downlink/terrestrial return link, etc., can of course be used. The cited Furht paper shows a few such alternate systems.

In the illustrated embodiment, network 16 is asymmetrical in transmission capacity. Each outgoing channel (i.e. from the head end 14 to the boxes 12) transfers data at a rate of up to 10 MB/second. Each incoming channel (i.e. from the boxes back to the head end) transfers data at a rate of up to 100 KB/sec). (In the illustrated embodiment, this asymmetry is due to the hardware devices used to relay data in different directions along the network, rather than a limitation on the cables themselves.) As will be evident below, such asymmetry is well suited to an MPEG compression architecture; the compression performed at the boxes causes the incoming data rate to be on the order of one—one hundredth of the outgoing data rate.

Desirably, the network supports several (e.g. 5) 10 MB/100 KB channels of information in order to serve a large number of set-top boxes 12. In the illustrated embodiment, these different channels are transmitted in frequency multiplexed form over the network 16. Each box 12 is associated with one such channel, and data sent thereto includes addressing bits in its packet structure that uniquely identify the recipient box.

At the head-end 14 of the network is a central processing facility (CPF) 42. CPF 42 is connected to the massively parallel network by fiber optic cable 44, but other high speed large bandwidth interconnections such as wireless connections, etc. can be used.

Figure 4:
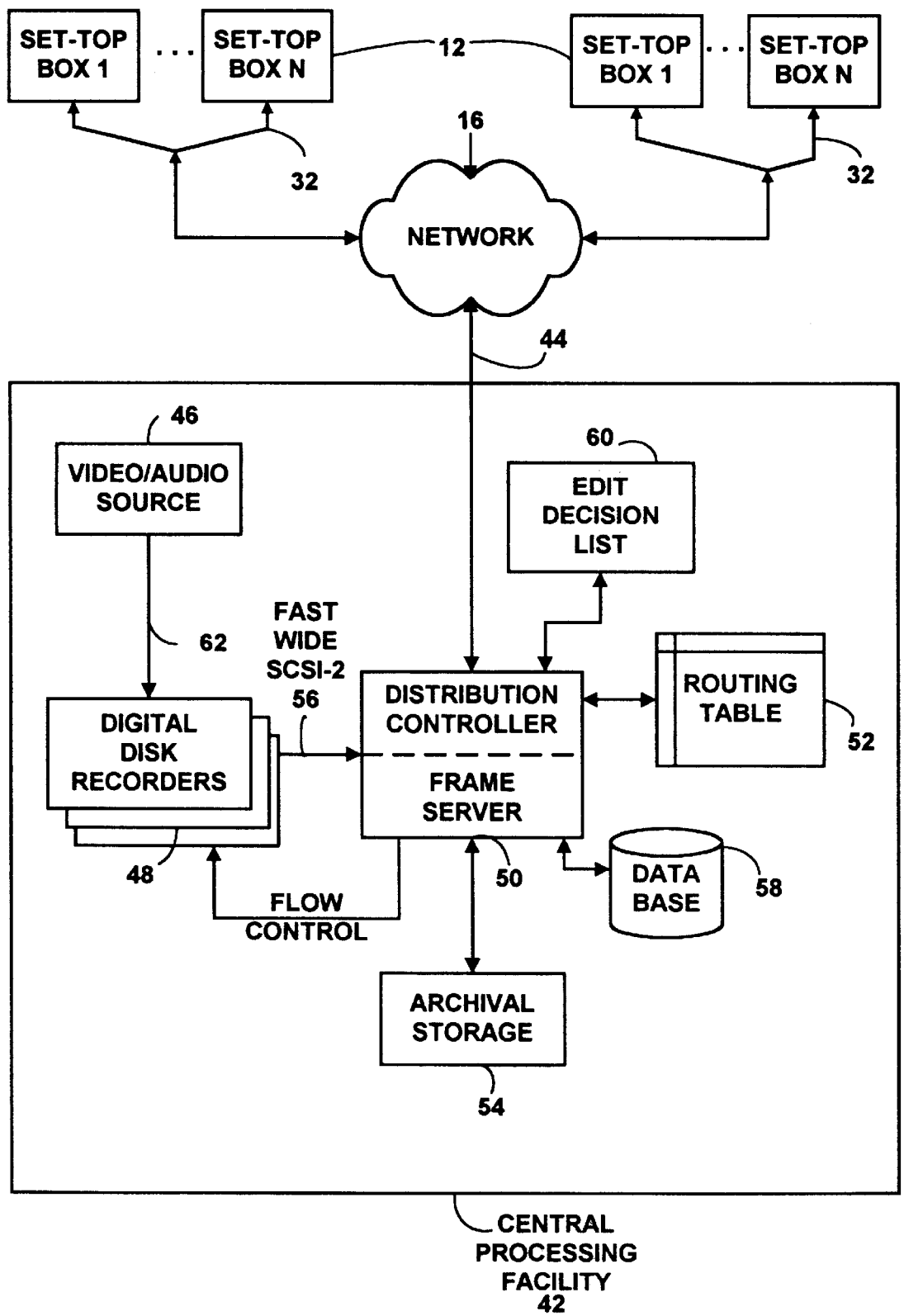
FIG. 4 is a diagram showing switching of a set-top box between two operational modes.

As shown in FIG. 4, CPF 42 includes a video/audio source 46, an array of digital disk recorders (DDRs) 48, a distribution controller/frame server 50, a routing table 52, and archival storage 54.

The video/audio source 46 can be one of any number of sources, such as a broadcast quality VTR with associated analog-to-digital conversion circuitry, or a feed from a remote source (e.g. a satellite downlink), etc.

The array of DDRs 48 serve as a spooling buffer for data from the video/audio source 46, and is responsive to control signals from the distribution controller/frame server 50. In the illustrated embodiment, each DDR 48 has a capacity of about 7 GB (which corresponds to about 128 seconds of video data at 1.8 MB per frame) and can deliver the data to the distribution controller/frame server 50 at a rate in excess of 10 MB per second.

Each DDR 48 is connected to distribution controller/frame server 50 by a bus 56, such as an FW-SCSI-2 bus. The FW-SCSI-2 is an ANSI standard Input/Output (I/O) interface used primarily for attaching data storage devices. Other high bandwidth interfaces can be used in place of the FW-SCSI-2.

(Since mass storage systems of the foregoing type are well known, the details of this aspect of the system are not belabored here. The interested reader is referred to, e.g., Gemmell et al, "Multimedia Storage Servers: A Tutorial," IEEE Computer Magazine, May, 1995, pp. 40–49, and the references cited therein, for additional information.)

The distribution controller/frame server 50 is a dedicated group of computer processors that accepts uncompressed video data from the DDRs 48 and partitions the data for transmission to the set-top boxes. The distribution controller/frame server also accepts MPEG compressed video frames back from the set-top boxes and sends them to archival storage 54. Any high speed computer processor, or group of processors working in parallel, can be used for the distribution controller/frame server.

Using several 10 MB per second channels, the distribution controller/frame server 50 can provide video frame data at a rate exceeding 50 MB per second onto the massively parallel distributed network and to the set-top boxes 12 for processing. The distribution controller/frame server then receives the MPEG encoded output data back from the network at a rate below 0.5 MB per second over the several channels and provides it to the archival storage 54.

Archival storage 54 is implemented with high capacity, high speed disks. The disks in the preferred embodiment have a storage capacity of in the hundreds of giga-byte range. Large capacity archival storage other than hard disks such as optical storage media, etc. can also be used.

The distribution controller/frame server 50 maintains a routing table 52 and a data base 58 to determine how to allocate the MPEG compression subtasks. The routing table 52 contains a list of set-top boxes, their current state, and route (addressing) information. The data base 58 contains information relating to the patterns of cable television receiver usage by cable subscribers, and is used in determining subtask distribution, as discussed below.

When video data is to be compressed, CPF 42 checks the data base 58 and the routing table 52 to determine which set-top boxes are available for MPEG compression. If desired, the CPF can send a message to candidate set-top boxes to confirm that they are actually in state one (28) (FIG. 3)(i.e. not being actively used for subscriber services).

Once CPF 42 has identified boxes 12 that are available for MPEG compression, distribution controller/frame server 50 downloads a software MPEG encoder to each of the boxes that is to be used. The software MPEG encoder can follow the model of the encoder described in Appendices A and B to ISO/IEC document 13818-5, or can be any other MPEG encoder known to artisans in the field.

Next, the distribution controller/frame server begins partitioning the video stream provided from DDRs 48 for distribution to the set-top boxes. Desirably, each box is assigned a group of pictures (GOP) that may span, e.g., a half second of video.

In the preferred embodiment, the distribution controller/frame server 50 does a rudimentary analysis of each group of pictures to determine if it includes an abrupt scene transition. If so, the GOP is broken into two groups, the second beginning at the abrupt transition. By this arrangement, each group of pictures is encoded into a single "I" (initial) frame, followed by one or more "P" (motion prediction) and "B" (difference) frames. (If an abrupt scene transition is included in a single group of pictures, two "I" frames would typically be required.)

For more insight into partitioning video for MPEG compression, the reader is referred to the Yu paper cited earlier, and the references cited therein.

After partitioning, each compression subtask (i.e. GOP) is routed to one of the available set-top boxes for processing. The routing table keeps track of which box is handling which subtask.

Each box compresses the group of pictures assigned to it, and returns the corresponding compressed data back to the CPF for storage in archival storage 54. The distribution controller/frame server 50 then assigns it another group of pictures for processing.

Whenever a subscriber activates the set-top box for TV viewing, the box 12 transmits a message packet to the distribution controller/frame server 50 informing it of the change from state one (28) (not actively being used the subscriber) to state two (30) (being used by the subscriber). This data is used by the distribution controller/frame server to update the routing table 52. If this activation occurs during the box's processing of a compression subtask, the subtask is naturally interrupted. In this case, the distribution controller/frame server may send that box's group of pictures to another set-top box for compression. The new set-top box would be initialized either to continue the MPEG compression from a intermediate state, or start the MPEG compression process over from the beginning.

Desirably, reassignment of a compression subtask to a substitute set-top box is not required to handle processing interruptions. Instead, the preferred embodiment of the invention redundantly assigns each compression subtask to several different set-top boxes. By so doing, interruptions at individual boxes do not unduly delay completion of the final compression task.

If a compression subtask is assigned redundantly to several boxes, the preferred embodiment treats the subtask as completed when the first box returns its results. Results thereafter returned by the other boxes are ignored. Data integrity of the first-to-complete results is enhanced by encoding the packets containing the compressed data with error correcting codes for their return to the CPF. In other embodiments, the data returned by two or more boxes can be compared against one another to assure data integrity.

As noted, whenever a box 12 switches states (FIG. 3), it informs the CPF 42. Most processing interruptions are identified in this manner. Other interruptions, however, may also occur. For example, a consumer may unplug the set-top box, or a lineman may temporarily disconnect a residential service. Desirably, means are provided to detect such interruptions.

One such approach is for the distribution controller/frame server 50 to set an internal timer each time it assigns a subtask to a set-top box. If the set-top box doesn't return its compressed results to the CPF 42 before the timer expires, the box's state is flagged as interrupted. In another embodiment the compression software executed on each box sends out a periodic "heartbeat" to the CPF reporting the box's status. If the CPF does not receive a box's heartbeat with a predetermined interval, the box is flagged as interrupted. In either event, the system recovers just as it would if the box switched from state one (28) to state two (30).

There are times when parts of the video stream stored on DDRs 48 may require special processing (e.g. noise filtering, etc.). Any required special processing is flagged in an edit-decision-list 60 associated with the video stream at the central processing facility 42. When the video is partitioned into subtasks for individual set-top boxes, the edit-decision-list is consulted for special instructions. If a box is assigned a group of pictures for which the edit decision list has corresponding instructions, these instructions are transmitted to the box with the group of pictures. In response, the box's software encoder adjusts its encoding parameters accordingly.

Due to local memory limitations at the set-top boxes 12, the group of frames comprising a single compression subtask are not downloaded all at once to the boxes. Instead, video frames are directed to the box one at a time, with the box requesting additional frames as needed from the distribution controller/frame server 50. Likewise, compressed data frames are returned to the CPF 42 for archival storage on a frame by frame basis, as they are completed by the software encoder. (In other embodiments having more local memory at the processing nodes, other arrangements can naturally be used.)

It will be recognized that the compressed frames returned from the set-top boxes to the central processing facility 42 may not arrive in temporal order. The distribution controller/frame server 50 assembles the frames in proper order before storage in the archival storage 54. (The distribution controller/frame server 50 also handles the multiplexing of compressed audio with the compressed video to achieve the correct ordering.)

To aid in efficient distribution of processing subtasks to set-top boxes, statistical methods are used to determine subscriber television viewing habits. These statistical methods are similar to the traffic analysis done in the telecommunications industry to determine network load and routing paths for specified hours of the day.

In the preferred embodiment, subscriber viewing habits are determined using data from the Nielsen Company, which compiles ratings for the television industry. Nielsen data typically includes the time of day and duration of television viewing. This information is saved in data base 58 and is then used to determine how to spread the MPEG compression load, and what hours of the day might be best suited to achieve the best MPEG compression results. Other statistical methods or queuing theory techniques can also be used to determine subscriber television viewing habits for MPEG compression load distribution.

Since even at peak viewing times, the Nielsen ratings indicate that only about 45% of the total number television sets are actually in use, a massively parallel network consisting of as few as 5,000 set-top boxes is adequate for several real-time MPEG compressing jobs running in parallel.

To achieve real-time MPEG compression, all the video frames contained on each of the DDRs need to be processed by the time that new video data would arrive to replace that already stored on the DDRs. To compress a two hour movie, a minimum of 6 DDRs (with 7 GB capacity each) working in parallel are required. Each set-top box then has a maximum of up to 12 minutes of network transfer and processing time to complete the compression of its GOP (i.e. ½ second of video). At most, therefore, if each set-top box takes the whole 12 minutes to process its ½ second of video, 240 set-top boxes working in parallel with each DDR would be required, or 1440 total set-top boxes.

If the set-top boxes do not need all 12 minutes to complete their respective subtasks, the number of boxes required drops proportionately. For example, if each set-top box completes its MPEG processing in 3 minutes, then only 360 set-top boxes are required. However, the outbound data channel (CPF-to-network) would then have to support a rate of 40 MB per second per outbound channel instead of 10 MB per second. The inbound rate would have to be 400 KB per second per inbound channel (network-to-CPF) instead of 100 KB per second.

If each set-box took more than 12 minutes to process a set of video frames, the total number of set-boxes would have to be increased, but the outbound and inbound data channel rates would also decrease proportionately.

Using the set-top boxes 12 in the massively parallel distributed computing system 10 to process input video image data (static or actual dynamic broadcast), an MPEG compression ratio of at least 100:1 can be achieved in real-time. In the preferred embodiment, the associated delay is always less than thirty minutes, irrespective of the duration of the input video data.

In state two (30), the set-top boxes may decompress video data that they earlier helped to compress. For example, if a subscriber requests an on-demand video service, MPEG compressed video data is retrieved from archival storage 54 and sent to the subscriber's set-top box. As noted, each set-top box contains MPEG decompression hardware 22 which is used to quickly and efficiently decompress MPEG compressed video before the video is viewed. The MPEG decompression is done in real-time as the MPEG compressed video frames arrive from the computer system 10.

Naturally, the data stored in archival storage 54 can be copied and used to provide compressed programming data for distribution on cable systems other than the one on which the data was compressed.

In another form of the invention, JPEG compression (ISO/IEC standard 10918) is advantageously used to reduce the system's data transfer and/or storage requirements. JPEG is a compression technique well known in the prior art for compressing individual still image or video frames. In systems according to this embodiment, dedicated JPEG processors are employed—either before 62 the source data is stored on DDRs 48, or in DDR output bus—to JPEG compress each frame of video before transmission to the set-top boxes. On receipt, each set-top box decompresses the JPEG-encoded data before performing the MPEG compression. The JPEG compression/decompression process helps eliminate high frequency noise common in video sequences, and improves the MPEG compression ratio.

If JPEG compression is used before 62 the DDRs 48, the storage capacity of the DDRs is reduced by the JPEG compression ratio (typically 2:1 to 10:1), and the bandwidth off the disks is reduced by a like factor, thereby reducing substantially the computer processing required. While JPEG compression ratios of up to 100:1 or more are possible, very high compression ratios should be avoided if broadcast quality output is to be maintained.

For expository convenience, the foregoing discussion has referred only to video signals. It should be understood that this is meant to include audio, which is typically associated with video signals, at least in the field of entertainment programming. The ISO/IEC MPEG II standard contemplates compression of audio with the video, and compression effected by the illustrated embodiment includes compression of the associated audio track.

Having illustrated and described the principles of the invention in a preferred embodiment, it should be apparent to those skilled in the art that the embodiment can be modified in arrangement and detail without departing with such principles. For example, while the invention has been illustrated with reference to an embodiment in which the processing nodes communicate only with the central processing facility 42, and not with each other, in other embodiments inter-node communications can advantageously be employed. Similarly, while the invention has been illustrated with reference to an embodiment in which data is transmitted over the network 16 in digital form, it will be recognized that the same architecture can be used to pass and process analog data. In some embodiments, the network can carry both analog and digital data, with the analog data being frequency multiplexed on top of the digital data, or relayed in another non-interfering fashion.

Still further, while various elements of the illustrated embodiment have been described as being implemented in hardware, in other embodiments software implementations may alternatively be used, and vice versa.

In view of the wide variety of embodiments to which the principles of my invention can be applied, it should be understood that the illustrated embodiments are exemplary only, and should not be taken as limiting the scope of my invention. Rather, I claim as my invention all such embodiments as come within the scope and spirit of the following claims and equivalents thereto.

I claim:

1. A method of MPEG encoding a series of input image data provided from a digital source using an apparatus including a plurality of cable television receivers, each television receiver including a processing unit, each television receiver having a first state in which the processing unit therein is performing a subscriber function such as display of video to a user, and a second state in which said processing unit is not performing a subscriber function, the receiver including means for changing between the first and second states, the apparatus further including a central facility coupled to each of said television receivers, the central facility including mass storage means, a control processor, and the digital source, the method comprising:

at the central facility, identifying television receivers that are in the second state;

partitioning the series of input image data from the digital source into a plurality of subparts to be processed in a plurality of subtasks;

allocating said subtasks among processing units in said television receivers that have been discerned to be in the second state as a plurality of subtasks;

at the television receivers, performing an MPEG encoding process on each of the subparts as part of execution of each of said subtasks;

collecting MPEG processed data from said receivers into said mass storage to form a composite set of MPEG processed data;

sensing a subtask interruption caused by a television receiver being changed from the second state before completing the subtask allocated thereto; and automatically recovering from said subtask interruption and completing the MPEG encoding.

2. The method of claim 1 which includes consulting a database in determining how to allocate subtasks among said units, the database including data related to patterns of cable television receiver usage by cable subscribers.

3. The method of claim 1 in which the automatically recovering step includes allocating a given subtask to a plurality of different processing units for redundant processing, wherein interruption of a subtask does not unduly interrupt the MPEG encoding.

4. The method of claim 3 which includes comparing MPEG processed data returned from at least two different of said processing units.

5. The method of claim 3 which includes consulting a database in determining how many different processing units to use in redundantly processing a given subtask, the database including data related to patterns of cable television receiver usage by cable subscribers.

6. The method of claim 1 which includes setting a time-out timer at the central facility for each television receiver allocated a subtask, and sensing a subtask interruption by failure of a television receiver to return data to the central facility before the expiry of the time-out timer corresponding thereto.

7. The method of claim 1 which further includes JPEG encoding and decoding the series of input image data prior to MPEG encoding.

8. The method of claim 7 which includes performing the JPEG decoding by the processing units in the television receivers.

9. The method of claim 1 which includes using a processing unit in a television receiver to produce exactly one I frame, and one or more B and P frames, for each of the subparts allocated to said unit.

10. The method of claim 1 which includes using a processing unit in a television receiver to produce one or more I, B and P frames for each of the subparts allocated to said unit, and transmitting said frames from the processing unit in the television receiver back to the central facility before processing of the subtask by the processing unit is completed.

11. The method of claim 1 in which the automatically recovering step includes reallocating said interrupted subtask to a different, substitute television receiver.

12. The method of claim 11 in which the reallocating includes providing restoration data from the central facility to the substitute television receiver to allow it to resume processing of the interrupted subtask from an intermediate state, rather than starting over.

13. The method of claim 11 in which the reallocating includes reinitializing the substitute processing unit to start the interrupted subtask from the beginning thereof.

14. The method of claim 1 in which data transfers related to the MPEG encoding process occur exclusively between the central facility and the television processing units, rather than also between different television receiver processing units.

15. In a computer programmed with MPEG compression software to process input moving image data to produce MPEG-encoded output data corresponding thereto, an improvement comprising means for achieving a compression ratio in excess of 100 to one with an ongoing delay of less than thirty minutes irrespective of the duration of the input moving image data, using a processor that, at other times, is used to perform functions unrelated to MPEG encoding.

16. The computer of claim 15 which includes means for providing input moving image data to the computer at a rate in excess of 400 megabits per second, and for providing MPEG-encoded output data corresponding thereto at a rate below 4 megabits per second.

17. In a method of MPEG compression that includes partitioning a video program into a plurality of clips for processing by a plurality of compression processors, an improvement comprising providing a plurality of different video programs that together total N hours of programming, and MPEG compressing all of said programs, simultaneously, to produce a corresponding plurality of MPEG-compressed programs, and completing said simultaneous compression in less than N hours.

18. The method of claim 17 which includes partitioning, at a control station, said N hours of programming into plural compression subtasks, and allocating said subtasks among plural processors.

19. The method of claim 18 which further includes automatically recovering from an interruption of subtask processing by one of said plural processors.

20. The method of claim 19 which includes allocating a given subtask to two or more different processors for redundant processing, wherein interruption of the subtask does not unduly interrupt the MPEG encoding.

21. The method of claim 20 which includes comparing MPEG processed data from at least two of said different processors.

22. The method of claim 19 which includes setting a time-out timer at the control station for each processor allocated a subtask, and sensing a subtask interruption by failure of a processor to return data to the control station before the expiry of the time-out timer corresponding thereto.

23. The method of claim 19 which includes reallocating said interrupted subtask to a different, substitute processor.

24. The method of claim 23 which includes providing restoration data from the control station to the substitute processor to allow it to resume processing of the interrupted subtask from an intermediate state, rather than starting over.

25. The method of claim 23 which includes reinitializing the substitute processor to start the interrupted subtask from the beginning thereof.

26. The method of claim 18 which includes coupling each of the plural processors only to the control station, and not to any other of said plural processors.

27. The method of claim 18 which further includes JPEG encoding and decoding the video program prior to MPEG encoding.

28. The method of claim 27 which includes performing the JPEG decoding at said plural processors.

29. The method of claim 18 which includes generating exactly one I-frame, and one or more B and P frames, as an output from each subtask.

30. The method of claim 17 which includes using said compression processors for non-compression functions at other times, wherein the compression processors do not comprise dedicated hardware.

31. In a computer programmed with MPEG compression software to process input moving image data to produce MPEG-encoded output data corresponding thereto, an improvement including plural processors receiving compression subtasks from a control station, said plural processors and control station collectively achieving a compression ratio in excess of 100 to one with an ongoing delay of less than thirty minutes irrespective of the duration of the input moving image data, at least some of said plural processors, at other times, being used to perform functions unrelated to MPEG encoding.

32. The method of claim 31 which further includes consulting a database to determine how to allocate subtasks among said plural processors, the database including data related to patterns of usage of said processors for said functions unrelated to MPEG encoding.

33. The method of claim 31 which further includes automatically recovering from an interruption of subtask processing by one of said plural processors.

34. The method of claim 33 which includes allocating a given subtask to two or more different processors for redundant processing, wherein interruption of the subtask does not unduly interrupt the MPEG encoding.

35. The method of claim 34 which includes comparing MPEG processed data from at least two of said different processors.

36. The method of claim 33 which includes setting a time-out timer at the control station for each processor allocated a subtask, and sensing a subtask interruption by failure of a processor to return data to the control station before the expiry of the time-out timer corresponding thereto.

37. The method of claim 33 which includes reallocating said interrupted subtask to a different, substitute processor.

38. The method of claim 37 which includes providing restoration data from the control station to the substitute processor to allow it to resume processing of the interrupted subtask from an intermediate state, rather than starting over.

39. The method of claim 37 which includes reinitializing the substitute processor to start the interrupted subtask from the beginning thereof.

40. The method of claim 31 which includes coupling each of the plural processors only to the control station, and not to any other of said plural processors.

41. The method of claim 31 which further includes JPEG encoding and decoding the moving image data prior to MPEG encoding.

42. The method of claim 41 which includes performing the JPEG decoding at said plural processors.

43. The method of claim 41 which includes generating exactly one I-frame, and one or more B and P frames, as an output from each subtask.

* * * * *

UNITED STATES PATENT AND TRADEMARK OFFICE
CERTIFICATE OF CORRECTION

PATENT NO. : 5,844,594

DATED : December 1, 1998

INVENTOR(S) : Ferguson

It is certified that error appears in the above-identified patent and that said Letters Patent is hereby corrected as shown below:

Column 12, line 37, "claim 41" should read -- claim 31--.

Signed and Sealed this

Twenty-eighth Day of March, 2000

Attest:

Q. TODD DICKINSON

Attesting Officer

Commissioner of Patents and Trademarks